Figure 1:
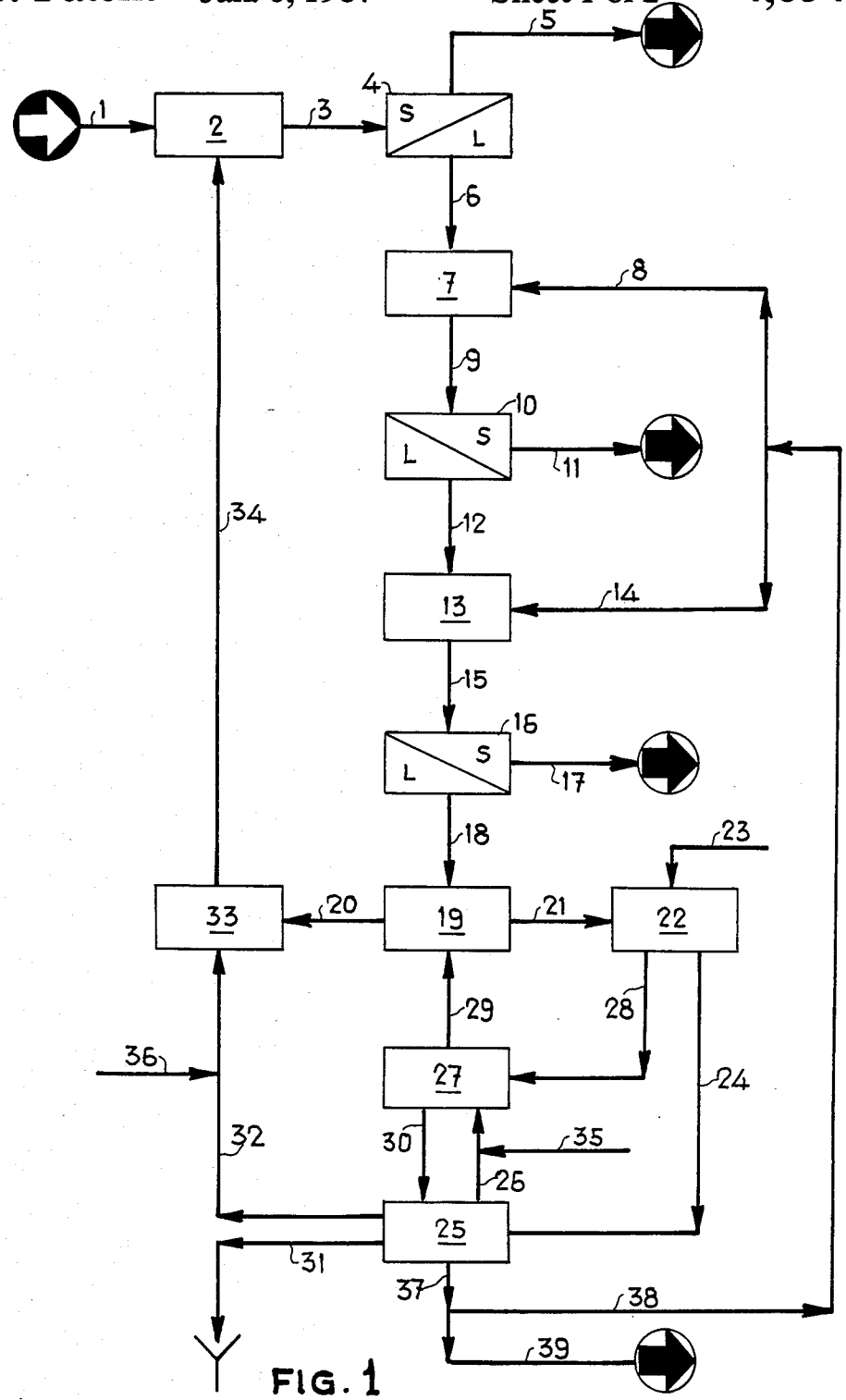

United States Patent [19]

Nogueira et al.

[11] Patent Number: 4,634,507

[45] Date of Patent: Jan. 6, 1987

[54] PROCESS FOR THE PRODUCTION OF LEAD FROM SULPHIDE ORES

[76] Inventors: Eduardo D. Nogueira, Avda. del Mediterraneo 47, 28007 Madrid; Enrique H. Tezanos, Aniceto Marinas 110, 28008 Madrid, both of Spain

[21] Appl. No.: 783,471

[22] Filed: Oct. 3, 1985

[51] Int. Cl.$^4$ .............................................. C25C 1/14
[52] U.S. Cl. ................................. 204/118; 204/128; 75/6; 75/101 BE; 75/104; 75/709; 75/111; 75/112; 75/113; 75/114; 75/120; 423/100; 423/103
[58] Field of Search .............. 423/100, 103; 75/6, 75/101 BE, 104, 109, 111-114, 120; 204/118, 128

[56] References Cited

U.S. PATENT DOCUMENTS

| | | | |
|---|---|---|---|
| 4,011,146 | 3/1977 | Coltinari et al. | 204/118 |
| 4,272,341 | 6/1981 | Lamb | 204/118 |
| 4,288,304 | 9/1981 | De Marthe et al. | 204/118 |
| 4,337,128 | 6/1982 | Haakonsen et al. | 204/118 |
| 4,362,607 | 12/1982 | Ritcey et al. | 204/118 |
| 4,421,616 | 12/1983 | Bjune et al. | 204/118 |
| 4,465,569 | 8/1984 | Bjune et al. | 204/118 |

*Primary Examiner*—R. L. Andrews

[57] ABSTRACT

The process for production of lead from lead sulphide ores involves leaching the ores with a ferric chloride solution, at a temperature from about 70° C. to 105° C., at a pH of from about 4.0 to 0.5, recovering the lead by cementation with metallic zinc, recovering the resultant zinc chloride by solvent extraction, and electrowinning zinc metal from the zinc chloride solution. Chlorine is also electrolytically produced for regenerating ferric chloride for the leaching step.

18 Claims, 2 Drawing Figures

PROCESS FOR THE PRODUCTION OF LEAD FROM SULPHIDE ORES

The conventional method for producing lead from its more common natural form, the sulphide ores, follows the, so-called, pyrometallurgical route.

Lead sulphide concentrates are roasted to produce gaseous $SO_2$ and lead oxide, that, afterwards, is reduced with any reducing agent to metallic lead, in a furnace at high temperature.

One alternative to this route, the chloride leaching of ores, has been continuously considered since long time, due to its potential advantages over the conventional process.

According to this route, the sulphide ore is reacted with chlorine, or any chlorinating agent such as ferric chloride. The sulphur content is left in elementary state, accompanying the solid residue, no leached; lead, as well as most of the other metals, is put into aqueous solution, as metal chloride.

The overall reaction, representing any divalent metal by the common simbol of Me, is

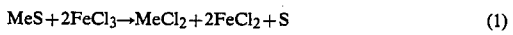

$$MeS + 2FeCl_3 \rightarrow MeCl_2 + 2FeCl_2 + S \qquad (1)$$

using ferric chloride, a very soluble salt, as the chlorinating agent.

The same goal is reached through direct chlorination of the sulphides with chlorine, as

$$MeS + Cl_2 \rightarrow MeCl_2 + S \qquad (2)$$

This reaction is practically equal to (1). It is catalyzed by a small concentration of Fe ions, thus suggesting that the chemical mechanism is the same in both cases. The invention, then, is applicable to both reactions.

The use of this reaction and the subsequent chloride route involves several conceptual advantages. Among them, as the main ones, are:

(a) Elimination of $SO_2$ gas emission, avoiding any conflict with air quality regulations.

(b) Production of a valuable by-product, sulphur, easily stockable, to be sold or processed.

(c) Use of relatively low temperatures, with direct implications in energy consumptions.

(d) Used of a leachant agent that can be regenerated, in closed circuit, by the chlorine reclaimed from latter stages of the process.

(e) Potential economy by use of small size plant, since the process is not encumbered by the necessity of a minimum threshold capacity to cope with sulfur dioxide recovery to sulphuric acid, among other factors.

Such potential advantages are not guaranted, obviously, just by using this leaching reaction; some other stages must be sucessful, in order to profit from these potencialities.

Latter stages of the process will require purification of the dissolved lead chloride and, finally, electrolysis to produce the metal and recover the chlorine.

Lead chloride purification is a difficult task, however, since there is not a technical method to achieve it in an economical way. Attempts to get a selective lead extracting agent have failed; the low solubility of the chloride being one of the main abstacles. Other type of operation, selective crystallization, implies the manipulation of toxic lead chloride crystals, whose presence in the breathing air may result very poisonous.

Consequently, it becomes a difficult task to obtain pure lead deposite by electrowinning, due to the presence of other metals. This is the main reason, but not the only one, of the failure of chloride leaching routes for lead electrowinning.

An indirect way to solve this problem, profiting from the advantages of the chloride route, will be to selectively cement the lead from the chloride solution, using zinc as cementing metal. Economical recovery of zinc out from the resulting zinc chloride solution will permit to recover the cementing agent and will make feasible this idea.

The purpose of this invention is a process that follows that route for lead production. This invention profits from recent technological developments, such as the development of selective cation exchange membranes and, particularily, the invention of a special Zn electrowinning cell.

Figure 2:
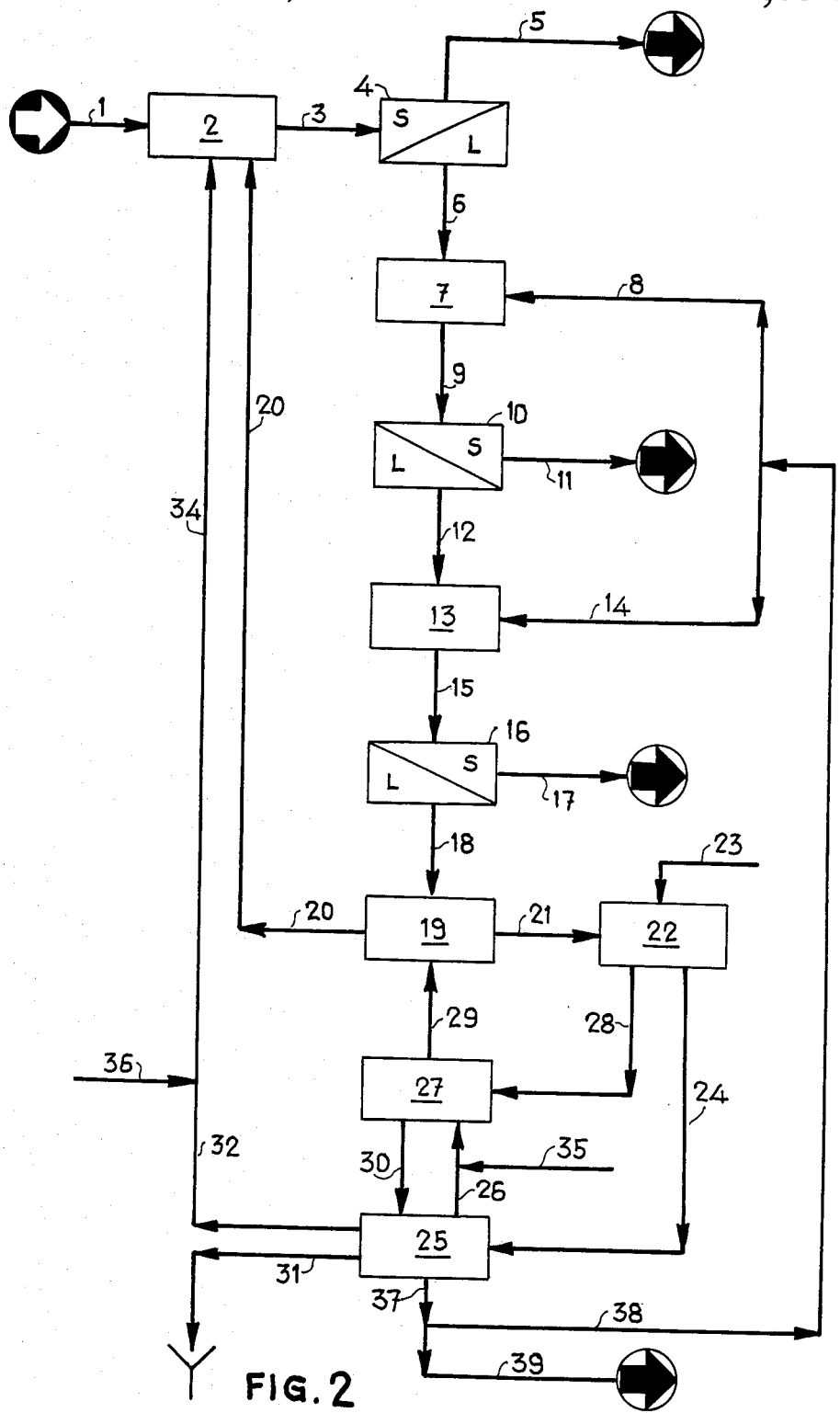

The invention skifully combines technologies in an original procedure described by the block diagram shown in FIG. 1 for the procedure following reaction (1) and FIG. 2 for the procedure following reaction (2).

Lead sulphide concentrates, 1, are leached in a reacting unit, 2, with ferric chloride solution, 34, coming from the process, in FIG. 1, or with chlorine gas, 20, and the reclaimed liquid, 34, in the procedure shown in FIG. 2.

The stream emerging from the reaction, 3, has solid and liquid components, that are separated in the unit 4. A solid, containing unreacted ore and the elemental sulphur produced, 5, is separated from the circuit. Sulphur can be won from such stream, using different available methods, or it can be marketed as such, since its concentration may reach a value as high as 70-90%, when treating usual lead concentrates.

The liquid stream, 6, contains the leachant in reduced form, as Ferrous (II) ion, and the chlorides of every leached metal, mainly lead. This chloride solution enters into a cementation unit, 7, where a controlled addition of Zn, 8, reduces the oxidation potential of the solution to a value of 300-400 mV. In this range, precious metals, Au and Ag, originally present in the ore, precipitate in metallic state, as a cement, leaving the rest of the metals in solution.

The solid-liquid stream coming out of this unit, 9, is separated in an adequate filtering unit 10. The solid cement, 11, whose composition in mainly precious metals, with some lead and zinc, is retired from the circuit, to be processed elsewhere.

The liquid fraction, 12, enters into a new cementing unit, 13 where additional zinc, 14, cements all the lead, abating the residual oxidation potential.

A new separation of solid and liquid streams, 15, in the new separating unit, 16, yields the lead production, 17, as the main product of the process.

Residual liquid stream, 18 is contacted in solvent extraction units, 19, with an organic phase, 29, containing a selective extractant for zinc chloride such as alkyl amines, or preferably alkyl phosphonates.

The raffinate from this unit, 20, with all the iron (II) untouched and its zinc content depleted to a level to be determinated by economical consideration, goes to the section where the leachant must be regenerated by chlorination, 33, in the scheme following reaction (1) in FIG. 1. For the scheme following reaction (2) in FIG. 2, stream 20 goes directly to the leaching unit.

The ladden organic stream, 21, enters into a stripping unit, 22, where it is contacted with stripping water, 23.

The aqueous stream, 24, from stripping contains zinc chloride, concentrated to 70 g/L of Zn content, approximately. It is processed separately, in a second circuit, essential to the invention, in two sections.

Formerly, metallic zinc is electrowon form the zinc chloride solution, as cathodic plates, 37, in a cell, 25, where, simultaneously, zinc is electrowon at the cathode and the chlorine is discharged at the anode.

Most of this produced zinc, 38, is reclaimed back to the cementation circuits, 8 and 14. Any zinc entering with the ore, 1, is produced in excess over that of stream, 38, and can be taken out from the process as a by-product, 39.

The catholyte is depleted in the cell to a level close to 20 g/L, further depletion would originate loss of quality in the deposit, as well as loss of energy efficiency, through loss of current efficiency and voltage increase. Thus, it must be taken out from the cell, 26, with a significant amount of zinc to be taken care of. It is done through a new solvent extraction stage, 27, where the depleted catholyte is contacted with the fresh organic phase, 28, coming from the stripping stage 22, of the previous solvent extraction unit. The organic takes practically all the zinc from the catholyte, and thus enters, 29, partially ladden, into the main extracting unit, 19.

Previously, in order to enhnace the extraction, the catholyte has been previously conditioned with a salt addition, 35. It increases the chloride concentration, allowing for the formation of the extraction complex compound.

The raffinated catholyte, 30, is then basically a salt solution, ready to be fed back to the cell as anolyte. In the anode, chlorine is discharged, 32, and sent back to the leaching circuit. A cation permselective membrane separates both electrodic spaces, impeding the presence of chlorine in the catholyte. Sodium ions passage through the membrane stablish the chemical equilibrium of the cell.

The amount of chlorine produced at the anode, apart from small losses, matches the amount spent in the leaching of lead and any other metal cemented with the zinc. A small, or discontinuous addition of incoming chlorine, 36, compensates for the losses.

In the first procedure, shown in FIG. 1, reclaimed and incorporated chlorine are used to regenerate the leachant oxidation potential in a chlorinator 33, in such a way that an oxidating stream, 34, with all the iron as Fe (III) can be fed continuously to the leaching reactors.

In the second procedure, FIG. 2, chlorine is fed directly, 20, to the leaching reactors, 2, where it meets the new concentrate 1, and the recirculated liquid, 34, that constitutes the medium where the reaction takes place. This liquid contains the minor iron concentration that catalyzes the leaching reaction.

In both cases, the depleted anolyte, 31, from the cell is discharged off, as a depleted, useless, brine.

This scheme of process operates equally with high or low iron concentration in the leaching circuit. The only adjusting measure required when the iron concentration is kept low, is to feed the chlorine stream, 32 and 36 directly into the leaching reactors, 2. Then, the chlorine is used directly in the leaching reaction, with the existing ferric ion acting as a catalyst. The choice between one or another type of operation will depend on the iron content of the lead concentrate.

The following examples illustrate the process of the present invention, but are not intented to limit it in any manner whatsoever.

EXAMPLE 1

A lead concentrate, whose chemical composition is given below, was fed to a battery of three stirred reactors in series. An aqueous slurry containing the concentrate was contacted with a chloride solution (2 g $Fe^{3+}$/L, 200 g $Cl^-$/L, 46 g Zn/L, 95 g $Na^+$/L) and chlorine gas was dispersed into the liquid phase. The main components of the concentrate were: Lead, 70% wt; Zn, 0.24%; Iron, 1.07%; Copper, 0.28%; Silver, 0.023%; Sulfur, 11.2%; other minor metals, 0.012%; Balance: water.

The test was carried out with residence time of 3 h, at a pH of 1 and at a temperature ranging from 75° to 90° C. Reacting slurry solid/liquid ratio was 20–25 g/L, and the Redox potential in the first reactor was approximately 600 mV (SCE). After solid-liquid separation, the pregnant liquor had a concentration of 15–20 g Pb/L, with Cu and Ag in the range of 10–60 ppm and of 2–20 ppm, respectively.

Leaching efficiencies were 92–99% for lead, 70–93% for silver and 20–50% for copper, with average values of 98, 91 and 40%, respectively.

EXAMPLE 2

A pregnant solution as those produced by the leaching stage of this invention, as in the example 1, was cemented with Zn dust, in a first cementing unit, at 50°–70° C., in stirred tanks, with residence time of 2 h. A solid, mainly composed by cemented lead, excess zinc dust, and other cemented metals is recovered. The solution is them ready to be treated in a second unit with chopped zinc cathodes, to extensively cement the remainder lead content.

Typical compositions of the various streams of this test system were:

| | CEMENTING UNIT STREAM COMPOSITION | | | | |
|---|---|---|---|---|---|
| | Leaching solution, g/L | Cement 1st unit, % | Emerging liquid 1st unit, g/L | INGOT Cement 2nd unit, % | Emerging liquid 2nd unit, g/L |
| Pb | 15.7 | 71.6 | 14.9 | 99.98 | 0.11 |
| Zn | 38 | 0.63 | — | 0.003 | 40.2 |
| Cu | 0.015 | 3.97 | 0.003 | 0.012 | — |
| Ag | 0.004 | 0.88 | — | 0.0045 | — |
| Fe | 1.6 | 0.11 | — | 0.0018 | — |
| Bi | — | 0.05 | — | 0.0008 | — |
| HCl | — | — | — | — | — |
| $Cl^-$ | 223 | — | 223 | — | 223 |
| pH | 1 | — | 0,7 | — | 3 |

For he cemented lead, 2nd unit, the presented composition corresponds to the final ingots, after melting and casting of the cement.

EXAMPLE 3

A pregnant zinc chloride bearing brine, similar to that gotten after lead cementation with metallic zinc, as presented in the example 2, was used as feed to a solvent extraction facility, with the composition given in table 1. The solvent extraction facility comprised 15 mixer-settlers, two for feed extraction, four for spent catholyte depletion, and nine for organic stripping. Both extraction and depletion sections, worked at ambient temperature (18°–25° C.), while the stripping section worked at higher temperature (50°–60° C.).

The organic solution used in this solvent extraction facility was di-butyl butylphosphonate (DBBP), 50% diluted in kerosene. The organic to aqueous (O/A) flow ratios for this test were 1.9 for extraction, 1.6 for depletion, and 1.7 for stripping.

The spent catholyte was an aqueous solution containing 28.6 g/L of zinc and 120 g/L of NaCl.

Under these conditions, the catholyte and anolyte, whose compositions are given in the table, were produced in the solvent extraction facility with a total zinc recovery above 98%.

TYPICAL COMPOSITIONS OF MAIN STREAMS OF SOLVENT EXTRACTION WITH DBBP 50% IN KEROSENE

| Element | Concentration, gpL | | | |
|---|---|---|---|---|
| | Feed | Raffinate | Aqueous Extract | Anolyte |
| Zn | 50.1 | 36.5 | 59.6 | 0.24 |
| Pb | 0.34 | 0.35 | 0.005 | 0.004 |
| Fe | 1.56 | 1.52 | 0.073 | 0.010 |
| $Cl^-$ | 220 | 206 | 66 | 74 |
| $SO_4^=$ | 3.7 | 3.9 | — | — |
| Cu | 0.12 | 0.11 | <0.001 | <0.001 |
| Cd | 0.23 | 0.21 | 0.001 | <0.001 |
| Co | 0.35 | 0.36 | <0.001 | <0.001 |
| Ni | 0.013 | 0.015 | <0.001 | <0.001 |
| As | 0.056 | 0.061 | <0.001 | <0.001 |
| Sb | 0.002 | 0.003 | <0.00002 | <0.00001 |
| Na | 98.0 | 97.3 | 0.2 | 48.2 |
| HCl | — | — | 1.4 | 3.5 |
| pH | 2.5 | 3.0 | — | — |

EXAMPLE 4

A stream, essentially consisting of an aqueous solution of zinc chloride (26–36 g Zn/L) and sodium chloride (59–126 g NaCl/L), was kept as recirculating catholyte in a electrowinning cell, as described in this invention. The cell was formed by six 25×20 cm titanium plates acting as cathodes and seven DSA anodes matching those dimensions. Anodes and cathodes were separated by Nafion #117 membrane sheets.

Catholyte composition was fed with a more concentrated solution of zinc chloride (56–66 g Zn/L).

Anolyte was formed by the raffinate of the solvent extraction depletion of the spent catholyte, according to the invention.

Its composition was:

| | Feed | Recirculating |
|---|---|---|
| NaCl, g/L | 115–120 | 42–90 |
| HCl, g/L | — | 0,6–3 |
| Flow, L/h | 10 | — |

Applied current density was 400 A/m², and temperature was kept in the range 35°–40° C.

Zinc was discharged as plates at the cathodes, from where they were periodically stripped, with an average thickness of 1.5 mm. Chlorine was discharged at the anodes, and reclaimed back at the leaching reactions, where it was used in leaching the sulphides to metal chlorides.

The cell was operated for 360 h, with voltage ranging from 2.8 to 3 V, and cathodic current efficiency in the 96–98% range.

We claim:

1. A process for lead metal production from lead sulphide concentrates which comprises: leaching lead sulphide, together with their precious metal content, silver and gold, by oxidation with chlorine gas in a strong chloride solution containing sodium chloride and iron cations, or directly by a ferric chloride solution, at a temperature in the range of about 70° C. to 105° C., at a pH value in the range of from about 4.0 to 0.5, and in the presence of from about 0.5 grams per liter of ferric cation as a minimum; recovering lead, silver, and gold from the brine solution, after solid residue removal, by cementation with metallic zinc; recovering zinc chloride from the resulting brine solution by solvent extraction, stripping the extracted zinc chloride with hot water to produce a pure and concentrated aqueous solution of zinc chloride, feeding such zinc chloride solution, as loaded catholyte, to a membrane electrowinning cell, in which cathode and anode are separated by a cation exchange membrane, discharging metallic zinc on the cathode, which is recycled back for lead cementation, zinc being electrically replaced in the catholyte by sodium cations which are transferred from the anolyte through the membrane; sending the spent catholyte to a depletion unit, where the remainder zinc chloride content is removed by solvent extraction and recycled back to the cell catholyte feed, said spent catholyte comprising sodium chloride and zinc chloride in solution, said spent catholyte having the same chloride content as the incoming catholyte, with sodium cations having been substituted for the electrowon zinc, said sodium cations coming from the anolyte; feeding the resulting zinc free sodium chloride solution to the anodic compartment of the electrowinning cell, where chloride ions are discharged on the anode, producing chorine, and the equivalent sodium ions are transferred to the cathodic compartment through the cation exchange membrane, and reclaiming the chlorine produced at the anode for using it as the oxidizing agent in the previous leaching operation to oxidize lead sulphide into lead chloride and elemental sulphur.

2. A process according to claim 1, wherein the oxidation leach reaction of the lead sulphide concentrate slurry in brine is carried-out under intense stirring conditions, with dispersion of chlorine gas into the reacting slurry.

3. A process according to claim 1 or 2, wherein the lead sulphide concentrate is present in the leaching slurry at solid-liquid ratio such that the maximum attainable lead concentration in the leaching brine is lower than 20 grams per liter.

4. A process according to claim 1 or 2, wherein the leach reaction of the lead sulphide slurry in brine is carried-out at a temperature of 90° C.±10° C.

5. A process according to claim 1 or 2, wherein the strong chloride solution for lead leaching is initially adjusted to a pH value of 1.0±0.2, and said pH value is maintained during the leaching reaction by the addition of hydrochloric acid.

6. A process according to claim 1, wherein the final redox potential of the reacting slurry is adjusted down to +500±50 mV (SCE), by the addition of fresh lead sulphide concentrate to the leach slurry.

7. A process according to claim 1, wherein the lead pregnant brine is subjected to two steps of cementation in series, first, adding zinc dust for precious metal recovery in a dose of 150±50 grams per cubic meter, and secondly, adding chopped zinc cathodes to rotary trommels to remove the remainder lead as metal lead cement.

8. A process according to claim 1, wherein the zinc chloride containing brine, leaving the lead cementation unit, is mostly recycled back to leaching, only a small fraction being bled-off in such a way as to reach a zinc concentration in the leaching brine not higher than 50 grams per liter.

9. A process according to claim 1, wherein the zinc chloride content of the brine solution is recovered by solvent extraction using an organic solution of a zinc chloride selective extractant, an aqueous insoluble alkyl phosphonate, with the production of a pure zinc chloride aqueous solution with the highest attainable zinc concentration in the order of 70±10 grams per liter.

10. A process according to claim 9, wherein the zinc chloride solution obtained is electrolyzed in an electrowinning cell with the simultaneous production of metallic zinc on the cathode and chlorine gas on the anode.

11. A process according to claim 1, 9 or 10, wherein the electrowinning procedure comprises: feeding the zinc chloride solution to a first liquid circuit where the catholyte, constituted by an acid aqueous solution of an alkali metal chloride and zinc chloride, is flowing through the cathodic compartment of the electrowinning cell, where the alkali metal chlorine is formed by electrodeposition of zinc cations on the cathode and the simultaneous transferring of alkali metal cations from the anolyte to the catholyte through a cationic permeable separator, recycling the anolyte, constituted by an aqueous solution of the alkali metal chloride, through the anodic compartment of the electrowinning cell, where the alkali metal chloride decomposes by chloride ions discharge on the anode with chlorine gas evolution and the simultaneous transferring of metal alkali cations to the catholyte through the cationic permeable separator, and applying to the electrodes of the cell an electrical D.C. voltage high enough to produce zinc electrodeposition on the cathode and chlorine discharge on the anode, both electrodic compartments being separated by a separator impermeable to liquids and permeable to alkali metal cations, through which the alkali metal cations are transferred, the separator thereby permitting the electrical current flow through the cell.

12. A process according to claim 1 wherein the alkali metal chloride concentration in the anolyte is adjusted to a value above 20 grams per liter by adding alkali metal chloride to the zinc chloride feed solution in a suitable concentration.

13. A process according to claim 1, wherein the zinc concentration in the catholyte is maintained above 15 grams per liter.

14. A process according to claim 1 wherein an acid concentration in the catholyte above 3 grams of free hydrochloric acid per liter is maintained in order to avoid the formation of hydroxide deposits inside the cationic permeable separator due to local alkalinization, the variation in acidity being a consequence of an imbalance in the current efficiencies of both electrodes, being corrected by addition of HCl to the catholyte circuit.

15. A process according to claim 1 wherein the spent catholyte is countercurrently contacted in several stages with the organic solution containing di-pentyl pentylphosophonate, in such a way as to remove the remainder zinc chloride down to levels below 0.25 grams of Zn per liter in the resulting sodium chloride solution, which is sent to the anolyte circuit of the electrowinning cell as the anolyte feed.

16. A process according to claim 1 wherein the separator in between the electrodic compartment is a cation exchange membrane resistant to the chemical attack of chlorine gas.

17. A process according to claims 1 or 16, wherein the electrical current density applied to the cathode is not higher than 800 Amps per square meter.

18. A process according to claim 1, wherein the electrodeposited zinc is periodically stripped from the cathode surface and chopped in small pieces, and the chlorine evolved at the anode is continuously removed and collected by a vacuum manifold.

* * * * *